United States Patent [19]

Rolfe

[11] Patent Number: 5,547,651
[45] Date of Patent: Aug. 20, 1996

[54] PROCESS FOR PRODUCTION AND USE OF DEACTIVATED GASEOUS ATOMIC NITROGEN FOR POST COMBUSTION GAS NITRIC OXIDE EMISSIONS CONTROL

[75] Inventor: Richard B. Rolfe, Dana Point, Calif.

[73] Assignee: Sol Bleiweis, Mission Viejo, Calif.

[21] Appl. No.: 423,023

[22] Filed: Apr. 17, 1995

[51] Int. Cl.$^6$ ................................. C01B 21/00
[52] U.S. Cl. .................. 423/235; 423/239.1; 423/351; 423/437 R
[58] Field of Search .................. 423/235, 351, 423/437 R, 239.1

[56] References Cited

U.S. PATENT DOCUMENTS

| | | | |
|---|---|---|---|
| 3,315,476 | 4/1967 | Kortlandt et al. | 62/20 |
| 3,531,664 | 9/1970 | Hals | 310/11 |
| 4,235,704 | 11/1980 | Luckenbach | 208/113 |
| 4,863,705 | 9/1989 | Epperly et al. | 423/235 |
| 4,921,683 | 5/1990 | Bedell | 423/235 |
| 5,171,554 | 12/1992 | Gardner-Chavis et al. | 423/239 |
| 5,234,670 | 8/1993 | Gardner-Chavis et al. | 423/235 |
| 5,260,043 | 11/1993 | Li et al. | 423/239.2 |
| 5,286,467 | 2/1994 | Sun et al. | 423/239.1 |
| 5,324,492 | 6/1994 | Masuda et al. | 423/235 |
| 5,372,706 | 12/1994 | Buchanan et al. | 208/113 |

FOREIGN PATENT DOCUMENTS 0335418  10/1989  European Pat. Off. .

Primary Examiner—Wayne Langel
Assistant Examiner—Amy M. Harding
Attorney, Agent, or Firm—Thomas I. Rozsa; Tony D. Chen

[57] ABSTRACT

A process for nitric oxide ($NO_x$) emissions reduction and post combustion gases at power plants and industrial boilers. The process deactivates nitrogen gaseous atoms which react with the nitric oxide to form $N_2+O(^3P)$. The process reduces the NO which is nitric oxide. The oxygen atom by itself reacts with carbon monoxide (CO) to become carbon dioxide ($CO_2$). The $N_2$ nitrogen atom simply becomes part of air. Therefore, the process reduces not only the nitric oxide, but also carbon monoxide.

35 Claims, 1 Drawing Sheet

PROCESS FOR PRODUCTION AND USE OF DEACTIVATED GASEOUS ATOMIC NITROGEN FOR POST COMBUSTION GAS NITRIC OXIDE EMISSIONS CONTROL

BACKGROUND OF THE INVENTION

1. Field of The Invention

The present invention relates to the field of air pollution control. More particularly, the present invention relates to the field of an air pollution control process which is intended to be used primarily for nitric oxide ($NO_x$) emissions reduction and post combustion gases at power plants and industrial boilers.

2. Description of The Prior Art

There has been considerable effort put forth in recent years to solving environmental and ecological problems, such as unhealthful air quality, acid rain, etc. Fuel combustion is the main source of air pollutants discharged into the atmosphere. Unless combustion exhaust gases are treated to remove deleterious air pollutants, the degradation of the environment will continue. One of the most prevalent components in polluted air are nitrogen oxides ($NO_x$). A major $NO_x$ component is nitric oxide (NO) which is the primary pollutant in all fuel combustion exhaust gases. Nitric oxide gas oxidizes in the atmosphere to form nitrogen dioxide ($NO_2$). Nitrogen dioxide is the primary reactant in atmospheric, photochemical reactions which produce unhealthful air pollutants, such as ozone. Nitrogen dioxide is also known to be an acid gas which, together with sulfur dioxide, causes acid rain.

Major sources of NO emissions are internal combustion engines and utility boilers. Nitric oxide is formed at high temperatures during fuel combustion by (1) the reaction of nitrogen and oxygen gas components of combustion air (thermal $NO_x$), and (2) the oxidation of fuel-bound nitrogen compounds (fuel $NO_x$). It is estimated that mobile sources, such as automobiles, trucks, and buses produce about 40% to about 50% of nitrogen oxides emissions in this country, while utility boilers produce about 33%.

Various methods are used to reduce nitrogen oxides in combustion exhaust gases so that gases may be discharged without harm to public health and the environment. Nitrogen oxides emissions from internal combustion engines and boilers are reduced by lowering peak combustion temperatures. Operational adjustments of air/fuel stoichiometry and mixing techniques and design modifications of engine and boiler components are used to lower $NO_x$ emissions.

Post combustion utility boiler $NO_x$ emissions control methods are described in "NOx Control Technologies and Their Availability and Extent of Application" (USEPA), February 1992, EPA-450/3-92-004. Several methods involve use of various chemicals, such as ammonia, urea, and cyanuric acid to reduce the nitrogen oxide content of exhaust gases by converting the nitrogen oxides to innocuous gases. Such chemical injection and reaction methods are commonly known as selective non-catalytic reduction (hereafter referred as "SNR"). SNR generally requires extremely high temperatures such as in the range of about 1600° F. and higher. SNR chemical reactions are slow, highly temperature sensitive, and sensitive to real-distribution of chemicals in the reaction zone. SNR generally require excess of chemicals in the reaction zone which tend to pass through the reaction zone and become secondary air pollutants. At its high operating temperature, SNR using ammonia or urea reduce $NO_x$ emissions by about 40%.

Slow, SNR chemical reactions for reducing nitrogen oxides content in exhaust gases are accelerated by use of catalysts effective in promoting the reduction of nitrogen oxides above 600° F. Methods using catalysts are generally referred to as selective catalytic reduction (hereafter referred to as "SCR"). Using catalysts with ammonia or urea injection in exhaust gas streams offers about 80% $NO_x$ emissions reduction but has a number of disadvantages. Disadvantages are high cost of catalyst, retrofit installation due to modifications required of boiler ducting, combustion air fans, heat transfer surfaces, and control system. SCR has limited ability to follow load changes while maintaining minimal ammonia pass-through due to reaction temperature sensitivity. Its application is generally limited to boilers not subject to frequent load changes. Catalyst replacement due to catalyst fouling and aging occurs about every three to five years resulting in boiler downtime and catalyst replacement costs.

In general, according to "$NO_x$ Control Technologies and Their Availability and Extent of Application" (USEPA), February 1992, the availability of post combustion $NO_x$ emission control methods is limited. As a result, no prior art exists for the application of scientific findings regarding use of deactivated nitrogen for post combustion $NO_x$ reduction or of any nitrogen oxides emissions control methods.

The following ten (10) prior art patents were uncovered in the pertinent field of the present invention:

1. U.S. Pat. No. 3,315,476 issued to Kortlandt et al. on Apr. 25, 1967 for "Controlled Nitrogen Addition To Recovered Hydrogen" (hereafter "the Kortlandt Patent");

2. U.S. Pat. No. 3,531,664 issued to Hals on Sep. 29, 1970 for "Means For And Method Of Removing Pollutants From Products of Combustion" (hereafter "the Hals Patent");

3. U.S. Pat. No. 4,235,704 issued to Luckenbach on Nov. 25, 1980 for "Method Of Reducing Oxides Of Nitrogen Concentration In Regeneration Zone Flue Gas" (hereafter "the Luckenbach Patent");

4. U.S. Pat. No. 4,863,705 issued to Epperly et al. on Sep. 5, 1989 for "Process For The Reduction Of Nitrogen Oxides In An Effluent" (hereafter "the Epperly Patent");

5. U.S. Pat. No. 4,921,683 issued to Bedell on May 1, 1990 for "Nitric Oxide Abatement Chelates" (hereafter "the Bedell Patent");

6. U.S. Pat. No. 5,171,554 issued to Gardner-Chavis et al. on Dec. 15, 1992 for "Conversion Of Formaldehyde And Nitrogen To A Gaseous Product And Use Of Gaseous Product In Reduction Of Nitrogen Oxide In Effluent Gases" (hereafter "the '554 Gardner-Chavis Patent");

7. U.S. Pat. No. 5,234,670 issued to Gardner-Chavis et al. on Aug. 10, 1993 for "Reduction Of Nitrogen Oxide In Effluent Gases Using NCO Radicals (hereafter "the '670 Gardner-Chavis Patent");

8. U.S. Pat. No. 5,260,043 issued to Li et al. on Nov. 9, 1993 for "Catalytic Reduction Of NOx And Carbon Monoxide Using Methane In The Presence Of Oxygen" (hereafter "the Li Patent");

9. U.S. Pat. No. 5,286,467 issued to Sun et al. on Feb. 15, 1994 for "Highly Efficient Hybrid Process For Nitrogen Oxides Reduction (hereafter "the Sun Patent"); and 10. U.S. Pat. No. 5,372,706 issued to Buchanan et al. on Dec. 13, 1994 for "FCC Regeneration Process With Low NO$_x$CO Boiler" (hereafter "the Buchanan Patent").

The Kortlandt Patent discloses a method related to the controlled nitrogen addition to recovered hydrogen responsive to temperature.

The Hals Patent discloses a method and apparatus for NO$_x$ reduction, which involves the use of sulfuric acid.

The Luckenbach Patent discloses a method of reducing NO$_x$ concentration in exit flue gas in the regeneration zone of a catalytic cracking unit. It controls the NO$_x$ concentration in the exit flue gas by adjusting the concentration of combustion promotor, which may be gold, silver, platinum, palladium, iridium, rhodium, mercury, ruthenium, osmium or rhenium.

The Epperly Patent discloses a method of NO$_x$ reduction in combustion effluent. The method involves introducing into the effluent a treatment agent comprising a five or six member heterocyclic hydrocarbons having at least one cyclic nitrogen.

The Bedell Patent discloses an NO abatement process for treatment of NO containing fluid. The process utilizes a polymeric cobalt (II) dioxygen diamine complex for contact with the NO containing stream.

The '554 and '670 Gardner-Chavis Patents disclose a method for the reduction of NO$_x$ in effluent gases by using NCO radicals. One method of obtaining the NCO radicals is by passing cyanuric acid through a catalytic decomposition zone. Another method, as introduced in the '554 Gardner-Chavis Patent and also disclosed in the '670 Gardner-Chavis Patent, is by passing formaldehyde (methanal) H$_2$CO and nitrogen or nitric oxide through a catalyst reactor. The catalyst reactor comprises Vanadium (V), Zirconium (Zr) or their mixture.

The Li Patent discloses a process of catalytically reducing NO$_x$ and CO in combustion effluent. The process involves the step of introducing methane into the effluent, and reacting the mixture with a crystalline zeolite which is exchanged with a cation selected from the group consisting of gallium, niobium, cobalt, nickel, iron, chromium, rhodium and manganese.

The Sun Patent discloses a hybrid process for NO$_x$ reduction. It involves the steps of first introducing a nitrogenous treatment agent such as urea into the effluent, then introducing ammonia into the effluent, and finally contacting the treated effluent with a NO$_x$ reducing catalyst. The catalyst may comprise vanadium oxide, tungsten oxide, titanium oxide, iron oxide, copper oxide, manganese oxide, chromium oxide, and noble metals such as the platinum group metals (e.g., platinum, palladium, rhodium and iridium) or their mixtures.

The Buchanan Patent discloses a fluidized catalytic cracking (FCC) regeneration process with low NO$_x$ CO boiler. The process involves operating the FCC regenerator in partial CO bun mode and adding air to the flue gas.

There exists a present need for a process which can achieve maximum NO$_x$ reduction in the post combustion stage (e.g., boiler convection section, flue gas duct or the stack) and utilizing a catalyst to produce a desired agent for that purpose. The catalyst will deactivate the nitrogen atom so that it is ready to rapidly react with NO$_x$ and not produce deleterious by product pollutants.

SUMMARY OF THE INVENTION

The present invention is a process for nitric oxide (NO$_x$) emissions reduction and post combustion gases at power plants and industrial boilers.

The object of the present invention process is to have deactivated nitrogen gaseous atoms which react with the nitric oxide to form N$_2$+O($^3$P). The process eliminates the NO which is nitric oxide. The oxygen atom by itself reacts with carbon monoxide (CO) to become carbon dioxide (CO$_2$). The N$_2$ nitrogen atom simply becomes part of air. Therefore, the process eliminates not only the nitric oxide, but also carbon monoxide.

It is therefore an object of the present invention to provide a process which reduces the nitric oxide (NO) from a post combustion gas stream at power plants and industrial boilers.

It is an additional object of the present invention to provide a process which not only reduces the nitric oxide from a post combustion gas stream, but also reduces carbon monoxide.

It is a further object of the present invention to provide a process which reduces the nitric oxide levels without the production of substantial amounts of other pollutants.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Throughout the specification and claims, the terms "nitrogen oxide(s)" and "NO$_x$" are used in the generic sense to include the various nitrogen oxide compounds such as nitric oxide (NO), and nitrogen dioxide (NO$_2$). The term "post combustion gas" is used to refer to effluent gases generated by and resulting from combustion processes.

The present invention provides a process which is used primarily for nitric oxide (NO) emissions reduction in post combustion gases at power plants and industrial boilers. The process is to produce deactivated nitrogen gaseous atoms from air which react with the nitric oxide (NO) to form N$_2$+O($^3$p). As a result, the process eliminates the NO which is nitric oxide. The oxygen atom by itself reacts with carbon monoxide (CO) to become carbon dioxide (CO$_2$). The N$_2$ nitrogen atom simply becomes part of air. The process reduces not only the nitric oxide, but also carbon monoxide (CO). The reaction is complete and very rapid, lending itself to removal of NO$_x$ emissions (hereafter referred to "DENO$_x$ process").

The object of the present invention is to utilize a catalyst for the purpose of $NO_x$ reduction in post-combustion stage (e.g., in the boiler convention section, the flue gas duct or the stack). The catalyst deactivates the gaseous nitrogen atoms from higher energy or electronic states to its base electronic state in $N(^4S)$ so that it is ready to rapidly react with $NO_x$ emissions while not reacting with carbon dioxide, oxygen and hydrocarbons present in the exhaust gas.

Figure 1:
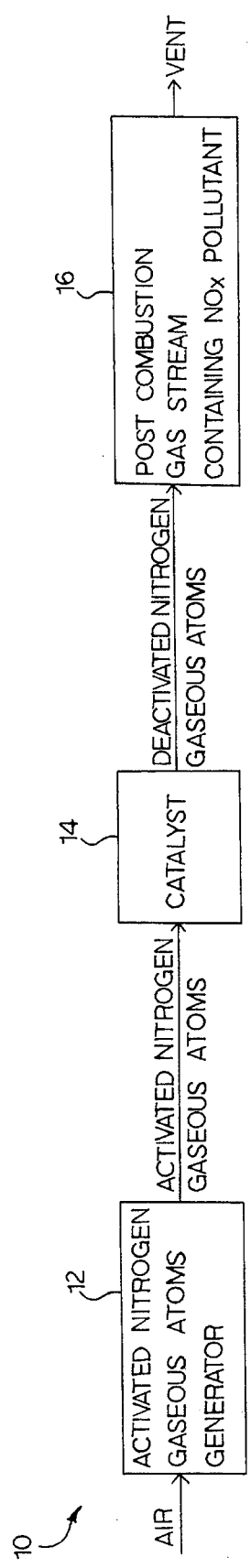
FIG. 1 is a simplified block diagram of the present invention process.

Referring to FIG. 1, there is shown at 10 a simplified block diagram which illustrates the general process of the present invention wherein activated nitrogen gaseous atoms are formed in an activated nitrogen gaseous atoms generator 12. The activated nitrogen gaseous atoms pass through a catalyst 14 to deactivate the nitrogen gaseous atoms and are then introduced into a post combustion gas stream 16 (e.g., in the boiler convention section, the flue gas duct or the stack), which contains the $NO_x$ pollutant. The deactivated nitrogen gaseous atoms react with the $NO_x$ in the exhaust gas, thereby reducing the $NO_x$ content of the gas before being vented to the atmosphere.

Figure 2:
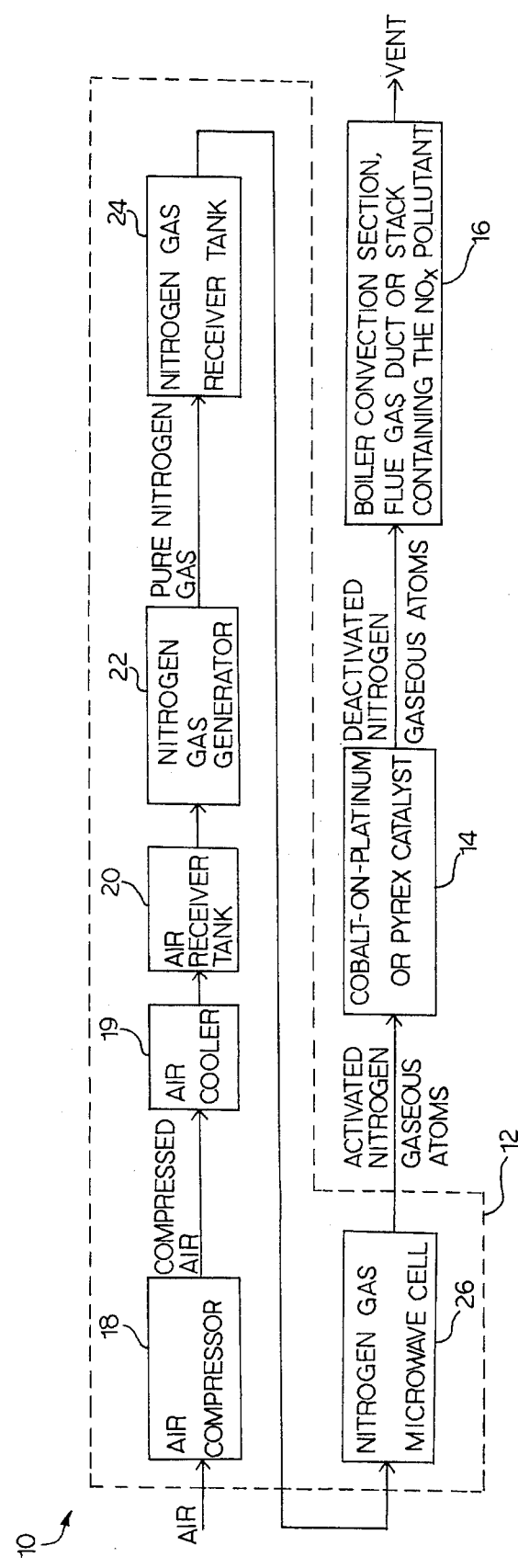
FIG. 2 is a detailed functional block diagram of the present invention process.

Referring to FIG. 2, there is shown a detailed functional block diagram of the present invention process 10. Air is compressed by one or more compressors 18 which operate in parallel to produce 25 to 50 PSIG compressed air. The compressed air is discharged to one or more air coolers 19 which is cooled to an optimal temperature (in the range of approximately 50° F. to approximately 100° F.) and discharged into one or more air receiver tanks 20. The compressed air from the air receiver tanks 20 is discharged to one or more nitrogen gas generators 22 comprised of conventional hollow fiber membranes (such as produced by Air Products, Airco and similar companies) to separate and produce approximately 97% to 99% pure nitrogen gas.

The pure nitrogen gas is still pressurized and flows directly to one or more nitrogen gas receiver tanks 24. These pressurized nitrogen gas receiver tanks 24 discharge directly to nitrogen gas microwave cells 26 which produce activated nitrogen gaseous atoms. The activated nitrogen gaseous atoms are then immediately deactivated to base state nitrogen atoms by use of a deactivating catalyst 14 all of which is located as part of a nitrogen gas piping system. The piping headers extend into the post combustion gas stream to spray the deactivated nitrogen gaseous atoms into the post combustion gas stream 16 to allow instantaneous reaction to occur with $NO_x$. The nitrogen gas production is produced by use of selective air membrane nitrogen gas generators which are commercially available.

Nitrogen gas atom production by microwave irradiation using RF generators and cavities are commercially available. The nitrogen gas microwave cell 26 contains an appropriately sized flow cell such as Brodia cell or concentric axial flow cell equipped with electrode-less RF discharge antennas suitable for about 2,450 MHz RF or microwave discharge. The RF or microwave generators, such as Magnetrons, operate as provided by Varian or equal with dedicated power supply and controls. The purpose of the irradiation is to take the nitrogen molecules $N_2$ and to turn them into gaseous nitrogen atoms. Some of these atoms are electronically excited.

Nitrogen gas atom deactivation to the preferred reactive state by use of a specific catalyst material (e.g. a cobalt-on-platinum or pyrex based catalyst) is to be specified and commercially available. The step involves taking all of the nitrogen molecules and passing them through the catalyst 14 to deactivate the nitrogen. It is this deactivation step that makes the nitrogen molecules deactivated and makes them workable for the process.

The key $DENO_x$ step is the injection and intermixing of the base state nitrogen atom gas into post combustion gas stream 16 for high efficiency reduction of nitric oxide air pollutant gases. For industrial and utility boiler installations, the injection headers are equipped with one or more common nitrogen gas microwave cells 26 followed by nitrogen gas deactivator cobalt-on-platinum or pyrex catalyst 14 and gas spray nozzles are located to spray and intermix the deactivated nitrogen atoms with the post combustion gas stream 16 at any location (e.g. in the boiler convection section, the flue gas duct or the stack).

The purified nitrogen gas is activated by microwave energy resulting in the production of gaseous nitrogen atoms in the base electronic state $N(^4S)$, and higher electronic states, $N(^2D)$ and $N(^2P)$. The deactivating catalyst deactivates $N(^2D)$ and $N(^2P)$ atoms to the base electronic state which is useful for further $DENO_x$ reaction. Once intermixed with the exhaust gas, the deactivated nitrogen gas is in the form of nitrogen atoms in the $N(^4S)$ electronic state. The nitric oxide molecules react immediately with the deactivated gaseous nitrogen atoms $N^4S)$, according to the well established reaction $N(^4S)+NO=N_2+O(^3P)$.

The reaction is complete and very rapid lending itself to a $DENO_x$ process. Previously, this reaction has been used for quantitative determination of activated nitrogen in lab research astrophysics studies. The DENOx reaction produces molecular nitrogen gas and a base electronic state oxygen atom, $O(^3P)$, as products. The $O(^3P)$ is expected to further combust gaseous carbon monoxide or hydrocarbons present in all post combustion gases as pollutants.

Other reactions of concern are the reaction of activated nitrogen with hydrocarbons present in trace quantities in post combustion gases to produce cyanogen and cyanide gases.

Use of highly activated nitrogen results in reaction with carbon dioxide and oxygen gases, primary components of post combustion gases. The main step to the present invention is the deactivation of nitrogen atoms to their base electronic state which will not react with carbon dioxide or oxygen gases or even the most reactive hydrocarbon, ethylene. The base state nitrogen atoms react quantitatively with nitric oxide in about a billionth of a second.

Other benefits include oxidation of carbon monoxide, unburned hydrocarbons and unburned carbon solids by oxygen produced in the $DENO_x$ reaction in boiler exhaust gases, thereby releasing additional fuel heat input and improving overall combustion device thermal efficiency.

The present invention has many advantageous features including: (a) unlike prior arts SNR and SCR removal $NO_x$ processes in use today at industrial and utility boilers, the deactivated nitrogen process does not require elevated or stable post combustion gas temperatures for reactions to proceed, thereby increasing reliability and lowering costs of materials; (b) unlike all other post combustion removal $NO_x$ processes, the deactivated nitrogen process does not depend on purchased chemicals for injection, thereby lowering costs and improving operating reliability; (c) the process does not pass through or produce deleterious chemicals such as ammonia; (d) the process produces beneficial reduction of carbon monoxide and hydrocarbon gaseous pollutants in exhaust gases and unburned carbon in fly ashes; (e) the process is not sensitive to temperature changes and variabilities; (f) the process provides flexibility in injection location into exhaust gases over a wide range of temperatures; (g) the process is capable of very high removal performance without pass through of deleterious or toxic chemicals like other processes; and (h) the process has expected low cost of retrofit of equipment and operation compared to SNR and SCR processes.

Defined in detail, the present invention is a process for reducing the nitric oxides of a post combustion gas stream, the process comprising the steps of: (a) providing a plurality of compressors which operate in parallel to produce compressed air; (b) cooling said compressed air to a temperature in the range of approximately 50° to approximately 100° F.; (c) discharging said compressed air into a plurality air receiver tanks; (d) discharging said compressed air from said plurality of air receiver tanks into a plurality of nitrogen gas generators which is comprised of hollow fiber membranes to separate and produce approximately 97% to 99% pure nitrogen gas; (e) discharging said approximately 97% to 99% pure nitrogen gas from said plurality of nitrogen gas generators directly into a plurality of nitrogen gas receiver tanks; (f) discharging said approximately 97% to 99% pure nitrogen gas from said plurality of nitrogen gas receiver tanks directly into a plurality of nitrogen gas microwave cells which produce activated nitrogen gaseous atoms, where the activated nitrogen gaseous atoms are immediately deactivated to base state nitrogen atoms by use of a deactivating cobalt-on-platinum catalyst; and (g) injecting said deactivated nitrogen gaseous atoms into said post combustion gas stream to allow instantaneous reaction to occur with said nitric oxides, thereby reducing said nitric oxides in said post combustion gas stream before venting the exhaust gas into the atmosphere.

Defined alternatively in detail, the present invention is a process for reducing the nitric oxides of a post combustion gas stream, the process comprising the steps of: (a) providing a plurality of compressors which operate in parallel to produce compressed air; (b) cooling said compressed air to a temperature in the range of approximately 50° to approximately 100° F; (c) discharging said compressed air into a plurality air receiver tanks; (d) discharging said compressed air from said plurality of air receiver tanks into a plurality of nitrogen gas generators which is comprised of hollow fiber membranes to separate and produce approximately 97% to 99% pure nitrogen gas; (e) discharging said approximately 97% to 99% pure nitrogen gas from said plurality of nitrogen gas generators directly into a plurality of nitrogen gas receiver tanks; (f) discharging said approximately 97% to 99% pure nitrogen gas from said plurality of nitrogen gas receiver tanks directly into a plurality of nitrogen gas microwave cells which produce activated nitrogen gaseous atoms, where the activated nitrogen gaseous atoms are immediately deactivated to base state nitrogen atoms by use of a deactivating pyrex catalyst; and (g) injecting said deactivated nitrogen gaseous atoms into said post combustion gas stream to allow instantaneous reaction to occur with said nitric oxides, thereby reducing said nitric oxides in said post combustion gas stream before venting the exhaust gas into the atmosphere.

Defined broadly, the present invention is a process for reducing the nitric oxides of a post combustion gas stream, the process comprising the steps of: (a) providing at least one compressor which produces compressed air; (b) cooling said compressed air; (c) discharging said compressed air into at least one air receiver tank; (d) discharging said compressed air from said at least one air receiver tank into at least one nitrogen gas generator which is comprised of means to separate and produce purified nitrogen gas; (e) discharging said nitrogen gas from said at least one nitrogen gas generator directly into at least one nitrogen gas receiver tank; (f) discharging said nitrogen gas from said at least one nitrogen gas receiver tank directly into at least one nitrogen gas microwave cell which produces activated nitrogen gaseous atoms, where the activated nitrogen gaseous atoms are immediately deactivated to base state nitrogen atoms by use of a deactivating catalyst; and (g) injecting said deactivated nitrogen gaseous atoms into said post combustion gas stream to allow instantaneous reaction to occur with said nitric oxides, thereby reducing said nitric oxides in said post combustion gas stream before venting the exhaust gas into the atmosphere.

Defined more broadly, the present invention is a process for reducing the nitric oxides of a post combustion gas stream, the process comprising the steps of: (a) providing compressed air; (b) generating nitrogen gas from said compressed air; (c) producing activated nitrogen gaseous atoms from said nitrogen gas; (d) deactivating said activated nitrogen gaseous atoms by using a catalyst to produce deactivated nitrogen gaseous atoms; and (e) injecting said deactivated nitrogen gaseous atoms into said post combustion gas stream, thereby reducing said nitric oxides in said post combustion gas stream before venting the exhaust gas into the atmosphere.

Defined even more broadly, the present invention is a process for reducing the nitric oxides of a post combustion gas stream, the process comprising the steps of: (a) generating activated nitrogen gaseous atoms; (b) deactivating said activated nitrogen gaseous atoms by a catalyst to produce deactivated nitrogen gaseous atoms; and (c) injecting said deactivated nitrogen gaseous atoms into said post combustion gas stream, thereby reducing said nitric oxides in said post combustion gas stream.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A process for reducing the nitric oxides of a post combustion gas stream, the process comprising the steps of:

a. providing a plurality of compressors which operate in parallel to produce compressed air;

b. cooling said compressed air to a temperature in the range of approximately 50° F. to approximately 100° F.;

c. discharging said compressed air into a plurality air receiver tanks;

d. discharging said compressed air from said plurality of air receiver tanks into a plurality of nitrogen gas generators which is comprised of hollow fiber membranes to separate and produce approximately 97% to 99% pure nitrogen gas;

e. discharging said approximately 97% to 99% pure nitrogen gas from said plurality of nitrogen gas generators directly into a plurality of nitrogen gas receiver tanks;

f. discharging said approximately 97% to 99% pure nitrogen gas from said plurality of nitrogen gas receiver tanks directly into a plurality of nitrogen gas microwave cells which produce activated nitrogen gaseous atoms, where the activated nitrogen gaseous atoms are immediately deactivated to base state nitrogen atoms by use of a deactivating cobalt-on-platinum catalyst; and g. injecting said deactivated nitrogen gaseous atoms into said post combustion gas stream to allow instantaneous reaction to occur with said nitric oxides, thereby reducing said nitric oxides in said post combustion gas stream before venting the exhaust gas into the atmosphere.

2. The process in accordance with claim 1 wherein said post combustion gas stream is located in a boiler convection section.

3. The process in accordance with claim 1 wherein said post combustion gas stream is located in a stack.

4. The process in accordance with claim 1 wherein said post combustion gas stream is located in a flue gas duct.

5. The process in accordance with claim 1 wherein said deactivated nitrogen gaseous atoms react with said nitric oxides to form $N_2+O$, where the nitrogen molecule $N_2$ becomes part of air and the oxygen atom reacts with carbon monoxide (CO) to become carbon dioxide ($CO_2$), thereby reducing carbon monoxide in said post combustion gas stream.

6. The process in accordance with claim 1 wherein said compressed air is in the range of 25 to 50 psig.

7. A process for reducing the nitric oxides of a post combustion gas stream, the process comprising the steps of:

a. providing a plurality of compressors which operate in parallel to produce compressed air;

b. cooling said compressed air to a temperature in the range of approximately 50° F. to approximately 100° F.;

c. discharging said compressed air into a plurality air receiver tanks;

d. discharging said compressed air from said plurality of air receiver tanks into a plurality of nitrogen gas generators which is comprised of hollow fiber membranes to separate and produce approximately 97% to 99% pure nitrogen gas;

e. discharging said approximately 97% to 99% pure nitrogen gas from said plurality of nitrogen gas generators directly into a plurality of nitrogen gas receiver tanks;

f. discharging said approximately 97% to 99% pure nitrogen gas from said plurality of nitrogen gas receiver tanks directly into a plurality of nitrogen gas microwave cells which produce activated nitrogen gaseous atoms, where the activated nitrogen gaseous atoms are immediately deactivated to base state nitrogen atoms by use of a deactivating pyrex catalyst; and g. injecting said deactivated nitrogen gaseous atoms into said post combustion gas stream to allow instantaneous reaction to occur with said nitric oxides, thereby reducing said nitric oxides in said post combustion gas stream before venting the exhaust gas into the atmosphere.

8. The process in accordance with claim 7 wherein said post combustion gas stream is located in a boiler convection section.

9. The process in accordance with claim 7 wherein said post combustion gas stream is located in a stack.

10. The process in accordance with claim 7 wherein said post combustion gas stream is located in a flue gas duct.

11. The process in accordance with claim 7 wherein said deactivated nitrogen gaseous atoms react with said nitric oxides to form $N_2+O$, where the nitrogen molecule $N_2$ becomes part of air and the oxygen atom reacts with carbon monoxide (CO) to become carbon dioxide ($CO_2$), thereby reducing carbon monoxide in said post combustion gas stream.

12. The process in accordance with claim 7 wherein said compressed air is in the range of 25 to 50 psig.

13. A process for reducing the nitric oxides of a post combustion gas stream, the process comprising the steps of:

a. providing at least one compressor which produces compressed air;

b. cooling said compressed air;

c. discharging said compressed air into at least one air receiver tank;

d. discharging said compressed air from said at least one air receiver tank into at least one nitrogen gas generator which is comprised of means to separate and produce purified nitrogen gas;

e. discharging said nitrogen gas from said at least one nitrogen gas generator directly into at least one nitrogen gas receiver tank;

f. discharging said nitrogen gas from said at least one nitrogen gas receiver tank directly into at least one nitrogen gas microwave cell which produces activated nitrogen gaseous atoms, where the activated nitrogen gaseous atoms are immediately deactivated to base state nitrogen atoms by use of a deactivating catalyst; and g. injecting said deactivated nitrogen gaseous atoms into said post combustion gas stream to allow instantaneous reaction to occur with said nitric oxides, thereby reducing said nitric oxides in said post combustion gas stream before venting the exhaust gas into the atmosphere.

14. The process in accordance with claim 13 wherein said post combustion gas stream is located in a boiler convection section.

15. The process in accordance with claim 13 wherein said post combustion gas stream is located in a stack.

16. The process in accordance with claim 13 wherein said post combustion gas stream is located in a flue gas duct.

17. The process in accordance with claim 13 wherein said purified nitrogen gas is approximately 97% to 99% pure.

18. The process in accordance with claim 13 wherein said catalyst comprises a cobalt-on-platinum base catalyst.

19. The process in accordance with claim 13 wherein said catalyst comprises a pyrex base catalyst.

20. The process in accordance with claim 13 wherein said deactivated nitrogen gaseous atoms react with the nitric oxides to form $N_2+O$, where the nitrogen molecule $N_2$ becomes part of air and the oxygen atom reacts with carbon monoxide (CO) to become carbon dioxide ($CO_2$), thereby reducing carbon monoxide in said post combustion gas stream.

21. A process for reducing the nitric oxides of a post combustion gas stream, the process comprising the steps of:

a. providing compressed air;

b. generating nitrogen gas from said compressed air;

c. producing activated nitrogen gaseous atoms from said nitrogen gas;

d. deactivating said activated nitrogen gaseous atoms by using a catalyst to produce deactivated nitrogen gaseous atoms; and e. injecting said deactivated nitrogen gaseous atoms into said post combustion gas stream, thereby reducing said nitric oxides in said post combustion gas stream before venting the exhaust gas into the atmosphere.

22. The process in accordance with claim 21 wherein said post combustion gas stream is located in a boiler convection section.

23. The process in accordance with claim 21 wherein said post combustion gas stream is located in a stack.

24. The process in accordance with claim 21 wherein said post combustion gas stream is located in a flue gas duct.

25. The process in accordance with claim 21 wherein said nitrogen gas is approximately 97% to 99% pure.

26. The process in accordance with claim 21 wherein said catalyst comprises a cobalt-on-platinum base catalyst.

27. The process in accordance with claim 21 wherein said catalyst comprises a pyrex base catalyst.

28. The process in accordance with claim 21 wherein said deactivated nitrogen gaseous atoms react with said nitric oxides to form $N_2+O$, where the nitrogen molecule $N_2$ becomes part of air and the oxygen atom reacts with carbon monoxide (CO) to become carbon dioxide ($CO_2$), thereby reducing carbon monoxide in said post combustion gas stream.

29. A process for reducing the nitric oxides of a post combustion gas stream, the process comprising the steps of:

a. generating activated nitrogen gaseous atoms;

b. deactivating said activated nitrogen gaseous atoms by a catalyst to produce deactivated nitrogen gaseous atoms; and c. injecting said deactivated nitrogen gaseous atoms into said post combustion gas stream, thereby reducing said nitric oxides in said post combustion gas stream.

30. The process in accordance with claim 29 wherein said post combustion gas stream is located in a boiler convection section.

31. The process in accordance with claim 29 wherein said post combustion gas stream is located in a stack.

32. The process in accordance with claim 29 wherein said post combustion gas stream is located in a flue gas duct.

33. The process in accordance with claim 29 wherein said catalyst comprises a cobalt-on-platinum base catalyst.

34. The process in accordance with claim 29 wherein said catalyst comprises a pyrex base catalyst.

35. The process in accordance with claim 29 wherein said deactivated nitrogen gaseous atoms react with said nitric oxides to form $N_2+O$, where the nitrogen molecule $N_2$ becomes part of air and the oxygen atom reacts with carbon monoxide (CO) to become carbon dioxide ($CO_2$), thereby reducing carbon monoxide in said post combustion gas stream.

\* \* \* \* \*

UNITED STATES PATENT AND TRADEMARK OFFICE
CERTIFICATE OF CORRECTION

PATENT NO. : 5,547,651

DATED : August 20, 1996

INVENTOR(S) : Richard B. Rolfe

It is certified that error appears in the above-identified patent and that said Letters Patent is hereby corrected as shown below:

On the title page, item [73] Assignee: should read as follows:

--[73] Assignee: Sol Bleiweis, Mission Viejo, Calif., part interest--

Signed and Sealed this

Eleventh Day of February, 1997

Attest:

BRUCE LEHMAN

*Attesting Officer*   *Commissioner of Patents and Trademarks*